(12) United States Patent
Schumacher et al.

(10) Patent No.: US 7,743,592 B2
(45) Date of Patent: Jun. 29, 2010

(54) CONNECTION ARRANGEMENT BETWEEN A DRIVE OF A MOWING SICKLE AND A MOWING SICKLE

(75) Inventors: Günter Schumacher, Raiffeisenstrasse 10, Eichelhardt (DE) 57612;
Heinrich-Günter Schumacher, Eichelhardt (DE)

(73) Assignee: Gunter Schumacher (DE)

( * ) Notice: Subject to any disclaimer, the term of this patent is extended or adjusted under 35 U.S.C. 154(b) by 0 days.

(21) Appl. No.: 11/714,519

(22) Filed: Mar. 6, 2007

(65) Prior Publication Data
US 2007/0209345 A1    Sep. 13, 2007

(30) Foreign Application Priority Data
Mar. 7, 2006    (DE) .................. 10 2006 010 825

(51) Int. Cl.
*A01D 34/00*    (2006.01)
*F16C 23/00*    (2006.01)
(52) U.S. Cl. .................. 56/17.6; 56/296; 384/495; 384/583
(58) Field of Classification Search .................. 56/17.6, 56/279, 298, 304; 384/201, 488, 495–498, 384/500, 510
See application file for complete search history.

(56) References Cited

U.S. PATENT DOCUMENTS 2,048,972 A * 7/1936 Scheffler ................. 384/498
2,258,517 A * 10/1941 Eustace ..................... 56/296

(Continued)

FOREIGN PATENT DOCUMENTS

DE    3701397    7/1988

(Continued)

*Primary Examiner*—Thomas B Will
*Assistant Examiner*—Joan D Misa
(74) *Attorney, Agent, or Firm*—Harness, Dickey & Pierce, P.L.C.

(57) ABSTRACT

A connection arrangement between a mowing sickle drive and a linear reciprocating mowing sickle has a first metallic connection element (4). The first connection element (4) forms either one component with the mowing sickle (1) or serves to connect the same. The first connection element (4) is at least partially formed annularly and includes a circular cylindrical bore (6), which defines a longitudinal axis (5). The first connection element (4) is slotted and includes a clamping mechanism (11) to change the cross-section of the bore (6). A metallic ring (14) has a circular cylindrical outer face (19) to nest in bore (6). A hollow spherical inner face (18) is on the intermediate ring (14). The intermediate ring (14) has at least one slot on its circumference. A rotational rolling member bearing has an outer metallic bearing ring (20) and is closed in a circumferential direction. The outer bearing ring (20) has a spherical outer bearing face (21), which is formed into the inner face (18) of the intermediate ring (14) and enclosed by the intermediate ring (14). The outer bearing ring has at least one outer race (22). At least one metallic inner bearing ring (23), closed in a circumferential direction is positioned inside of said outer bearing ring (20). The inner ring (23) includes at least one inner race (24) and has a through extending receiving bore (26). Rolling members (25) are arranged between the outer race (22) and the inner race (24). A second connection element (27), which includes a driving trunnion (29), rests in the receiving bore (26).

9 Claims, 3 Drawing Sheets

U.S. PATENT DOCUMENTS

| | | | |
|---|---|---|---|
| 2,297,317 A * | 9/1942 | Paradise et al. | 56/158 |
| 2,829,933 A * | 4/1958 | Loretto | 384/498 |
| 3,148,492 A * | 9/1964 | Naor | 56/306 |
| 3,602,560 A * | 8/1971 | Memmel | 384/126 |
| 3,679,279 A * | 7/1972 | Van Dorn et al. | 384/537 |
| 4,331,367 A * | 5/1982 | Trudeau et al. | 384/202 |
| 4,380,889 A * | 4/1983 | Isbell | 56/296 |
| 4,718,780 A * | 1/1988 | Trudeau | 384/206 |
| 5,061,087 A * | 10/1991 | Roerig et al. | 384/192 |
| 6,216,429 B1 * | 4/2001 | McCredie | 56/287 |
| 6,648,514 B2 * | 11/2003 | Cevasco et al. | 384/281 |
| 6,876,111 B2 | 4/2005 | Kuroda et al. | |
| 7,121,074 B1 * | 10/2006 | Regier et al. | 56/296 |

FOREIGN PATENT DOCUMENTS

| | | |
|---|---|---|
| DE | 3931736 | 4/1991 |
| DE | 4035528 | 5/1992 |
| GB | 420795 | 12/1934 |
| WO | WO 2006/013188 | 2/2006 |

\* cited by examiner

CONNECTION ARRANGEMENT BETWEEN A DRIVE OF A MOWING SICKLE AND A MOWING SICKLE

CROSS-REFERENCE TO RELATED APPLICATION

This application claims priority to German Patent Application No. 102006010825.6 filed Mar. 7, 2006, which application is herein expressly incorporated by reference.

FIELD

The disclosure relates to a connection arrangement between a mowing sickle drive and a mowing sickle.

BACKGROUND

DE 40 35 528 C2 describes a connection arrangement between a mowing sickle drive and a linear reciprocating mowing sickle in double sickle cutting devices of front mowers.

The introduction of a lifting movement is achieved via a driving pin connected to a pivotably moved drive lever. This represents a connection element in a further connection element including a pivoting bearing connected to the mowing sickle. The pivoting bearing arrangement is necessary, as the driving trunnion is moved, because of its attachment to the drive lever following the pivot movement of the drive lever on a circular track. Since the mowing sickle is only guided in a linearly reciprocating fashion during operation, the arrangement has to allow for a constant pivoting movement of the driving trunnion relative to the connection element connected to the mowing sickle as well as an axial displacement of the driving trunnion. The first connection element, which connects the mowing sickle, has an annular formed portion with a circular cylindrical bore. An intermediate ring, closed in a circumferential direction, is accommodated in the bore and is retained with its circular cylindrical outer face adapted to the contact bore. The intermediate ring has a hollow spherical inner face. The hollow spherical inner face pivotably houses a bearing ring, closed in circumferential direction, and houses a spherical outer face. The bearing ring has a circular cylindrical through bore. The driving trunnion displaceably rest in the bore, along the axis of the through bore, to compensate for position change which results from the movement of the driving trunnion with the drive lever on a circular track relative to the displacement axis of the mowing sickle.

Other drives for mowing sickles are known where movement of the connection element, connected to the mowing sickle, corresponding to the linear reciprocating movement of the mowing sickle, is directly introduced by a gearing arrangement. This is illustrated, for example, and described in DE 39 31 736 C2. Here, no permanent relative movements need to be compensated for in the connection arrangement between a connection element, formed as a driving trunnion, and a connection element, connected to the mowing sickle. However, adjustment must be possible, which enables relative positioning of the components to each other during assembly. This adjustment must be securely maintained and must enable an easy detachment for the exchange of the mowing sickle.

The disclosure provides a connection arrangement between a mowing sickle drive and a mowing sickle. The connection enables a secure maintaining of the assembly position. Also, it enables removal and renewed assembly and easy detachment and adaptation to the eventually changed assembly. Further, the connection enables a long life span.

SUMMARY

This disclosure provides a connection arrangement between a mowing sickle drive and a linear reciprocating mowing sickle which comprises a first metal connection element which forms either one component of the mowing sickle or serves for the connection to the same. The first connection element is at least partially formed annularly and includes a circular cylindrical through bore, which defines a longitudinal axis. The connection element is slotted and includes a clamping mechanism which changes the cross-section of the through bore. An intermediate metal ring has a circular cylindrical outer face adapted to mate with and be positioned in the through bore. Also, the intermediate ring has a hollow spherical inner face. The intermediate ring has at least one slot on its circumference. A rotational rolling member bearing has an outer metal bearing ring closed in a circumferential direction. The outer bearing ring has a spherical outer bearing face form fit into the inner face of the intermediate ring. The outer bearing ring is enclosed by the intermediate ring. The outer bearing ring forms at least one outer race. The rolling member bearing has at least one metal inner bearing ring closed in a circumferential direction. The inner ring forms at least one inner race and has a through extending receiving bore. Rolling members are arranged between the outer race and the inner race. A second connection element, which includes a driving trunnion, rests in the receiving bore.

An advantage of this embodiment is that when the intermediate ring, also made of metal like the other components, is strongly pretensioned by the clamping mechanism, no deformation occurs which, in turn, makes detaching of the connection difficult. After detaching the clamping mechanism, free pivotal movement can be carried out between the rotational rolling member bearing relative to the intermediate ring. Likewise, adjustments of the intermediate ring can be carried out along the longitudinal axis in the first connection element. This is especially advantageous when the intermediate ring is made from steel. Also, all other components of the connection arrangement can advantageously be made from steel. The connection arrangement is also compact, due to the outer bearing ring representing at the same time, the element which is pivotably held in the intermediate ring. The above described nesting forces, which act onto the connecting arrangement, always act centrally onto the bearing ring which provides further advantages. Advantageously, due to the intermediate ring being manufactured from metal, heat conduction is achieved to the outside away from the rotational rolling member bearing. This is also supported by the direct contact of the metal components.

Advantageous force carrying is achieved by the rotational rolling member bearing formed as a double taper roller bearing.

The slotted construction of the first connection element is preferably achieved by the first connection element being interrupted by a first slot. The first connection element has a first and second front face along the longitudinal axis. The first slot extends between the first front face and the second front face. In this case, the first slot extends substantially parallel to the longitudinal axis.

Clamping is achieved by reducing the cross-section of the through bore. Projecting lugs are formed on the first connection element at both sides of the first slot. The lugs have through holes which receive at least one clamping screw.

The intermediate ring has a first end face and a second end face along the longitudinal axis. An advantageous design of the intermediate ring is achieved by a second slot interrupting its circumference between the first end face and the second end face. In this case, the second slot can extend, projected onto the longitudinal axis, parallel thereto or intersect the longitudinal axis. Alternatively, it is possible for the intermediate ring to be provided with second slots extending from one or both end faces, which, respectively, end in front of the other end face. In this case, the second slots extend from different end faces and are alternately arranged over the circumference of the intermediate ring. Preferably, they extend parallel to the longitudinal axis.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
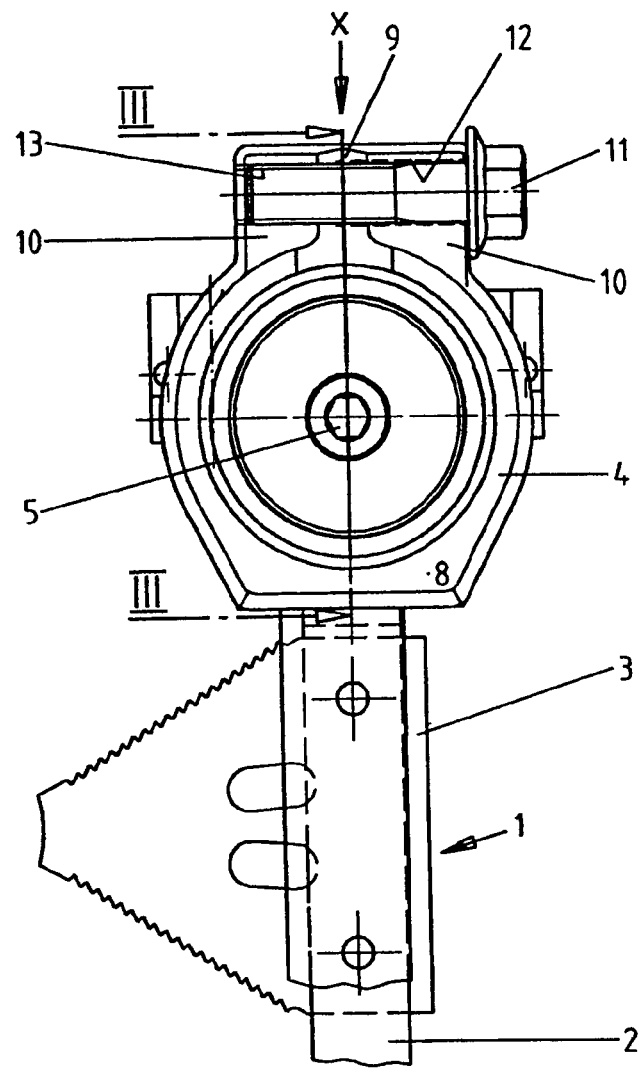
FIG. 1 is a top view of a connection arrangement connected to the mowing sickle.

FIG. 1 illustrates a portion of a mowing sickle 1 with an attached sickle-bar 2 and blade 3. As illustrated in the drawing plane, in the extension of the sickle-bar 2, a multitude of blades 3 are mounted on the sickle-bar 2. At the end of the sickle-bar 2, a first connection element 4, made from metal and in the form of a knife head eye, is attached. The first connection element 4 has a first front face 7 and a second front face 8. A bore 6 extends through the connection element 4 between the two front faces 7, 8 and is centered on a longitudinal axis 5.

Figure 2:
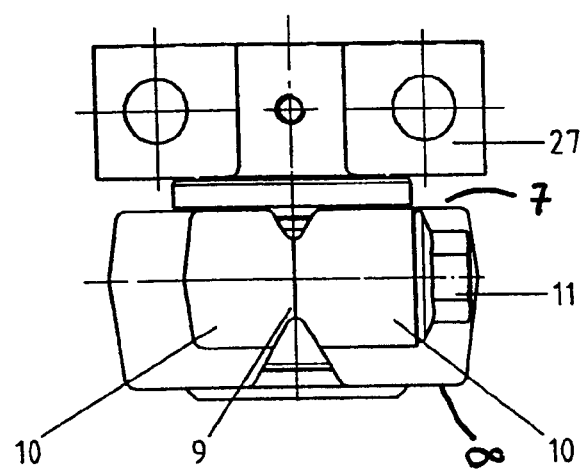
FIG. 2 is an elevation view in the direction of the arrow X of FIG. 1.

As seen in FIG. 2, the first connection element 4, formed like a ring, is slotted. A first slot 9 extends through the ring between the two front faces 7, 8. The first slot 9 extends parallel to the longitudinal axis 5. However, it also could be arranged to the axis 5.

At both sides of the first slot 9, two lugs 10 are provided that project away from the longitudinal axis 5. One of the two lugs 10 is provided with a through bore 12. The bore 12 is arranged on an axis spaced from and intersecting the longitudinal axis 5. A threaded bore 13 is provided on the axis of this bore 12, in the second lug 10. A clamping screw 11, especially a cap screw, passes through the bore 12 and is screwed into the threaded bore 13. Thus, the clamping screw 11 causes a reduction of the cross-section of the through bore 6, depending on the extent of its tightening.

Figure 3:
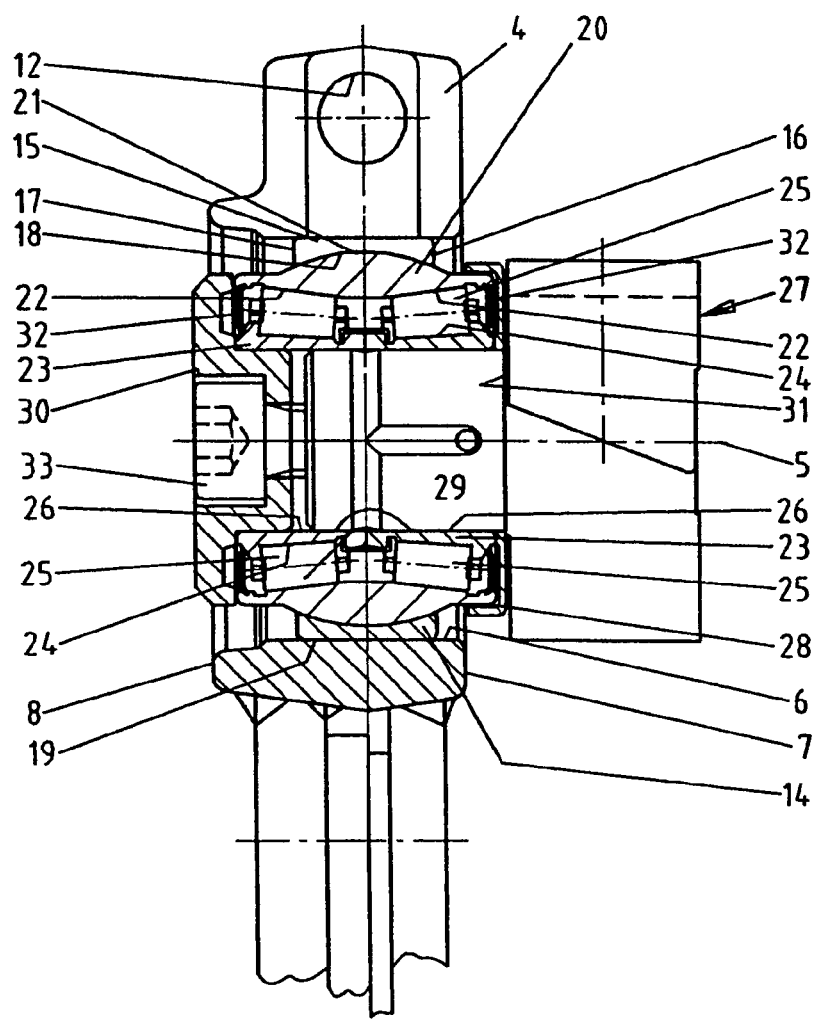
FIG. 3 is a sectional view along a longitudinal axis through the connection arrangement.
Figure 4:
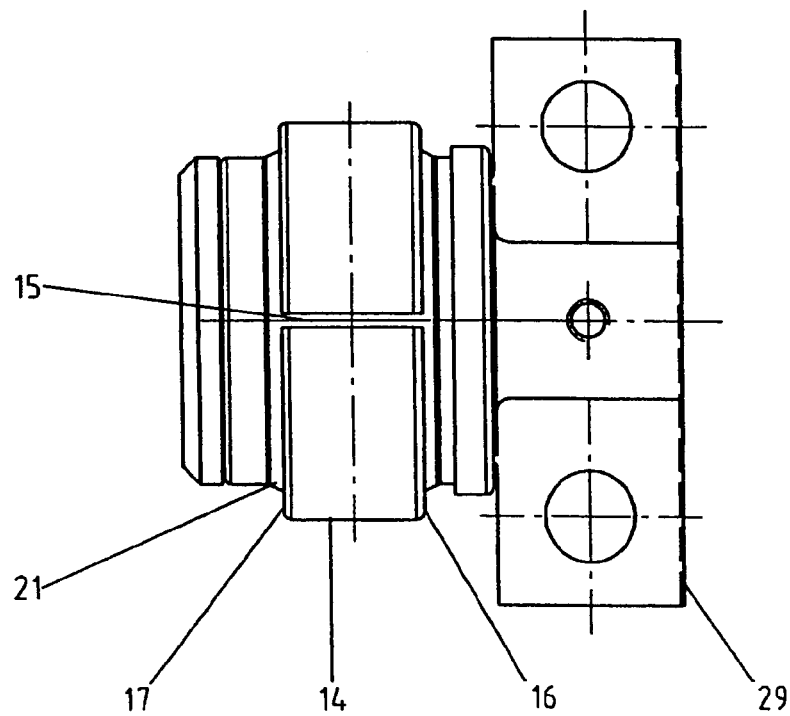
FIG. 4 is a view comparable to FIG. 2 with the first connection element removed.

A metal intermediate ring 14 rests in the circular cylindrical bore 6, as seen in FIG. 3. The intermediate ring 14 has a first end face 16 and a second end face 17 along the longitudinal axis 5. The intermediate ring 14 is interrupted on its circumference by a second slot 15. The second slot 15 extends through the ring between the first end face 16 and the second end face 17. The slot 15 is aligned parallel to the longitudinal axis 5 (see FIG. 4) but can also extend at an angle to the axis so that it intersects the axis.

The intermediate ring 14 is preferably made from steel. Thus, when no pressure acts on the ring transverse to the longitudinal axis 5, the ring elastically holds open the second slot 15. The intermediate ring 14 has a hollow spherical inner face 18 and a circular cylindrical outer face 19. The intermediate ring 14 is accommodated by its circular cylindrical outer face 19 in the circular cylindrical bore 6 of the first connection element 4. The ring 14 is adjustable in the bore 6 along the longitudinal axis 5. This means that the distance between the first front face 7 and the second front face 8 of the first connection element 4 is larger than the distance between the first end face 16 and the second end face 17 of the intermediate ring 14.

A rotational rolling member bearing includes an outer bearing ring 20. The outer bearing ring 20 is closed in a circumferential direction and has a spherical outer bearing face 21. The spherical outer bearing face 21 is adapted to nest in the hollow spherical inner face 18 of the intermediate ring 14. The assembly of the intermediate ring 14 on the outer bearing ring 20 can be achieved by an elastic expansion of the intermediate ring due to the second slot 15. The ring's hollow spherical inner face 18 nest on the spherical outer bearing face 21 of the outer bearing ring 20. The outer bearing ring 20 is pivotably held by this arrangement in the intermediate ring 14.

The outer bearing ring 20 has two conical outer races 22. The two outer races 22 decrease in diameter towards each other. Further, two inner bearing rings 23 are provided which are common in taper roller bearings. These two inner bearing rings 23 have, respectively, an inner race 24. Rolling members are arranged between the outer race 22 of the outer bearing ring 20 and the inner race 24 of each inner bearing ring 23. In total, two rows of rolling members, in the form of tapered rollers, are arranged in the circumferential direction. Instead of a taper roller bearing, for example, a double row angular contact ball bearing can be used. The two inner bearing rings 24 together forms a receiving bore 26. The receiving bore 26 is circular cylindrically formed to receive a driving trunnion 29.

The driving trunnion 29, in the form of a connection block, belongs to the second connection element which is securely accommodated in the bore 26. The driving trunnion 29 ends in a shoulder 31. One of the inner bearing rings 23 abuts this shoulder 31. The two inner bearing rings 23 are forced against this shoulder 31 by an attachment ring 30. The attachment ring 30 is retained by a screw 33 screwed into the driving trunnion 29 along the longitudinal axis. Thus, the two bearing rows of the rotational rolling member bearing, formed as a taper roller bearing, are pre-tensioned. The rotational rolling member bearing can be manufactured from metal, which is appropriate for such bearings and loadings, as they are common in mowing sickle drives.

Sealing is achieved by the design of the attachment ring 30 in connection with a seal 32. Furthermore, sealing in a direction towards the shoulder 31 is also accomplished by a seal 32 and a protective ring 28.

The correct position of the second connection element 27 and of the driving trunnion 29 in pivot direction can be fixed along the longitudinal axis 5 around the fulcrum formed by the hollow spherical inner face 28 and the spherical outer bearing face 20. According to assembly conditions, tightening of the clamping screw 11 also positions and adjusts, in an inclined position, the intermediate ring 14 along the axis of the through bore 6. Thus, the cross-section of the through bore 6 is reduced in such a manner that a radial force acts on the intermediate ring 14. Also, since the intermediate ring 14 itself has a slot, second slot 15 between its end faces 16, 17, the diameter of the intermediate ring 14 can also be reduced. Accordingly, the intermediate ring 14, with its hollow spherical inner face 18, presses against the spherical outer bearing face 21 of the outer bearing ring 20. Thus, the outer bearing ring 20 is fixed. The outer bearing ring 20 is selected with dimensions such that the outer ring 20 itself does not experience deformation. Thus, the clamping forces do not have any influence on the bearing play and the running conditions of the rotational rolling member bearings.

The intermediate ring is formed from metal, and especially from steel. The metal has elastic characteristics which enables the ring to take up its original shape once the forces are removed. Thus, the slot, in its relaxed condition, provides the ring 14 with its largest width. Accordingly, the clamping effect is effectively cancelled after the unscrewing of the clamping screw. Thus, a repeated smooth adjustment is possible.

Figure 5:
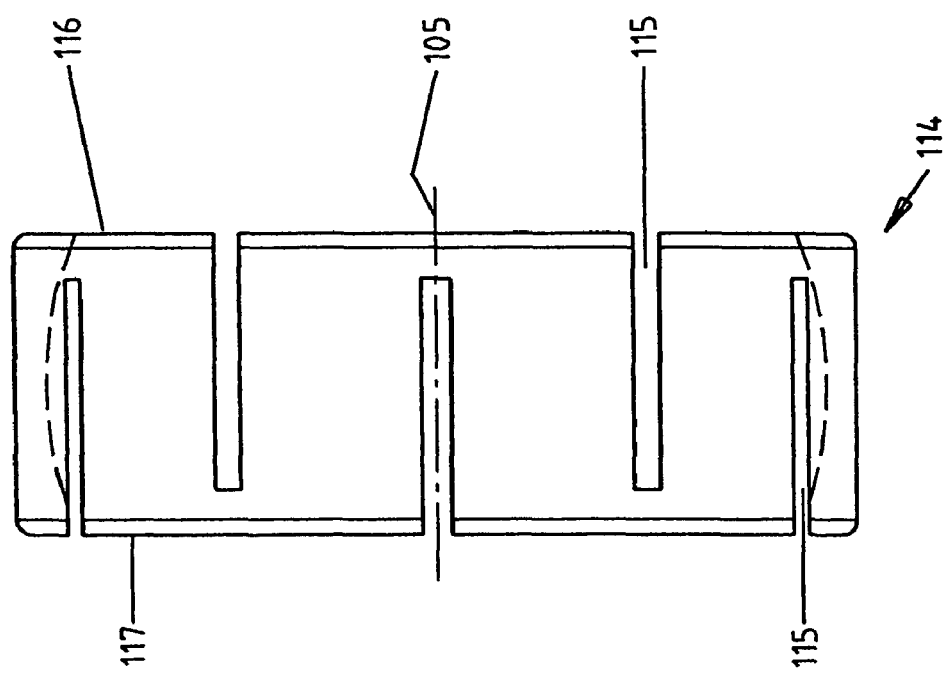
FIG. 5 is a plan view of an alternative design of an intermediate ring.

FIG. 5 is an enlarged view of an intermediate ring 114 shown as an individual component in side view. The inner face is also formed as a (not visible) hollow spherical face. The intermediate ring 114 is provided with second slots 115 on its circumference around the longitudinal axis 105. A partial number of the second slots 115 extends from the end face 116 and ends in front of the end face 117. The residual number of second slots 115 extends from the end face 117 and ends in front of the end face 116. The second slots 115 are alternately distributed on the circumference of the intermediate ring 114 starting from the one end face 116 and the other end face 117. Accordingly to this arrangement, the intermediate ring 114 can be radially elastically deformed and hold the outer bearing ring of the rotational rolling member bearing in a clamped condition. The intermediate ring 114 is also made from metal, especially steel. Besides steel, other metals can be used. The second slots 115 extend parallel to the longitudinal axis 105.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A connection arrangement between mowing sickle drive and a linear reciprocating mowing sickle comprising:
    a first metal connection element forming either one component with the mowing sickle or serving for connection with the mowing sickle, said first connection element being at least partially annularly formed and including a circular cylindrical bore defining a longitudinal axis, said first connection element including a slot and a clamping mechanism for changing the cross-section of the bore;
    a metal intermediate ring including a circular cylindrical outer face adapted to nest with said bore, said metal intermediate ring being axially adjustable along said longitudinal axis with respect to said first metal connection element and a hollow spherical inner face on said intermediate ring, and at least one slot on a circumference of said intermediate ring;
    a pretensioned rotational rolling member bearing including a metal outer bearing ring closed in a circumferential direction, said outer bearing ring including a spherical outer bearing face, formed fitting into the inner face of the intermediate ring and being enclosed by the intermediate ring, at least one outer race formed on said outer bearing ring, at least one metal inner bearing ring closed in the circumferential direction, said inner ring including at least one inner race and a through extending receiving bore, rolling members are arranged between the outer race and the inner race; and
    a second connection element includes a cantilevered driving trunnion, which nests in the receiving bore.

2. The connection arrangement according to claim 1, wherein the rotational rolling member bearing is formed as a double taper roller bearing.

3. The connection according to claim 1, wherein the first connection element has a first front face and a second front face along the longitudinal axis and said first connection element is interrupted by a first slot, which extends between the first front face and the second front face.

4. The connection arrangement according to claim 3, wherein lugs are formed at both sides of the first slot on the first connection element, said lugs have through holes with at least one clamping screw.

5. The connection arrangement according to claim 1, wherein the intermediate ring has a first end face and a second end face along the longitudinal axis and said intermediate ring is interrupted by a second slot extending between the first end face and the second end face.

6. The connection arrangement according to claim 1, wherein the intermediate ring has a first end face and a second end face along the longitudinal axis and second slots are provided on a circumference, said second slots extending from one or both end faces with their ends, respectively, in front of the other end face.

7. The connection arrangement according to claim 6, wherein the second slots, starting from different end faces, are alternately arranged over the circumference of the intermediate ring.

8. The connection arrangement according to claim 5, wherein the second slot, projected onto the longitudinal axis, extends parallel or intersects the longitudinal axis.

9. The connection arrangement according to claim 6, wherein the second slots extend parallel to the longitudinal axis.

* * * * *